US007562091B2

(12) United States Patent
Crim et al.

(10) Patent No.: US 7,562,091 B2
(45) Date of Patent: Jul. 14, 2009

(54) CASCADE FEATURE FOR CREATING RECORDS IN A DATABASE

(75) Inventors: Christopher Lee Crim, San Jose, CA (US); Shaun Patrick Flisakowski, San Jose, CA (US)

(73) Assignee: Apple Inc., Cupertino, CA (US)

( * ) Notice: Subject to any disclaimer, the term of this patent is extended or adjusted under 35 U.S.C. 154(b) by 386 days.

(21) Appl. No.: 11/015,246

(22) Filed: Dec. 16, 2004

(65) Prior Publication Data
US 2006/0136465 A1 Jun. 22, 2006

(51) Int. Cl.
*G06F 17/24* (2006.01)
(52) U.S. Cl. .................. 707/102; 707/100; 707/101
(58) Field of Classification Search .......... 707/100, 707/101, 102
See application file for complete search history.

(56) References Cited

U.S. PATENT DOCUMENTS

| | | | | |
|---|---|---|---|---|
| 4,918,593 A | * | 4/1990 | Huber | 707/200 |
| 5,892,682 A | * | 4/1999 | Hasley et al. | 716/12 |
| 6,704,743 B1 | * | 3/2004 | Martin | 707/103 R |
| 6,941,524 B2 | * | 9/2005 | Lee et al. | 715/854 |
| 7,013,312 B2 | * | 3/2006 | Bala et al. | 707/200 |
| 7,020,659 B2 | * | 3/2006 | Yorke | 707/102 |
| 7,062,502 B1 | * | 6/2006 | Kesler | 707/102 |
| 7,185,317 B2 | * | 2/2007 | Fish et al. | 717/121 |
| 2003/0212705 A1 | * | 11/2003 | Williamson et al. | 707/103 R |
| 2003/0229610 A1 | * | 12/2003 | Van Treeck | 707/1 |
| 2004/0068517 A1 | * | 4/2004 | Scott | 707/104.1 |
| 2005/0278277 A1 | * | 12/2005 | Forlenza et al. | 707/1 |
| 2006/0069679 A1 | * | 3/2006 | Percey et al. | 707/6 |
| 2006/0155778 A1 | * | 7/2006 | Sharma et al. | 707/201 |

OTHER PUBLICATIONS

William Stallings, "Operating Systems, Chapter 11: File Management," Second Edition, Prentice Hall, pp. 450-486.
John Viescas, "Running Microsoft Access 200, Part I: Understanding Microsoft Access," Microsoft press, pp. 3-76.

* cited by examiner

*Primary Examiner*—Charles Rones
*Assistant Examiner*—Phuong-Thao Cao
(74) *Attorney, Agent, or Firm*—Beyer Law Group LLP

(57) ABSTRACT

Techniques for providing a "cascade create" mechanism which allows data to be entered in related non-existing records in the database are disclosed. The techniques can be used to provide a database program that supports graphical, bi-directional data relationships, as well as multiple predicates. The "cascade create" mechanism supports arbitrary data relationships, as well as complex data models that are not supported by conventional techniques. Furthermore, the "cascade create" mechanism frees the users and database programmers from having to write code or provide rules that are specific to a particular data model and/or specific data relationship.

24 Claims, 9 Drawing Sheets

US 7,562,091 B2

CASCADE FEATURE FOR CREATING RECORDS IN A DATABASE

BACKGROUND OF THE INVENTION

The present invention relates to databases and, more particularly, to providing a cascade feature for a database program which can serve as an interface to a database.

Databases are used to store data in a manner that facilitates subsequent use of the data. Typically, a database includes several tables containing one or more records. A record in a table stored in the database can hold information about a subject or item in its various fields.

To allow a user to more easily access and manage data stored in databases, database programs have been developed. Database programs, among other things, often provide a user interface which allows the user to conveniently interact with the database program in order to perform various operations on the data stored in the database. The interface provided by the database program is typically a graphical user interface which allows the user to conveniently interact with the database program and, in turn, with the database. The user may interact with the graphical user interface to, for example, view the data in various ways. The visual representations provided to the user can include, for example, a browse mode. The browse mode allows records to be viewed, changed, sorted, deleted, or added.

FIG. 1 is a representative screen depiction of a database program, namely, FileMaker Pro 4.0 by FileMaker Pro, Inc. of Santa Clara, Calif. The screen depiction pertains to an asset management database having three records. A browse mode for the first record of the asset management database is depicted. The browse mode is suitable for on-line or screen viewing of the records of the asset management database and allows the records to be viewed or deleted. The data in the fields of the record can be changed, sorted, deleted or added in the browse mode.

As noted above, a database program allows users to conveniently access data stored in a local database. It should be noted that the database program may also provide the capability to access data that is stored in a remote location. For example, the database program can be connected to another database program over a computer network. In this situation, one database program can act as a "client" (or guest) and establish a connection to the other database program "server" (or host). The client database program can, in turn, provide the user with access to data which is stored remotely.

In addition, a database program can provide many other useful features. One useful feature can be referred to as the "cascade create" option. The "cascade create" option allows users to enter data into a non-existent related record (i.e., a record that has not been created in the database, but should be in order to maintain or establish a relationship between data). This means that the database program can automatically create the required record and enter data for the user. However, it should be noted that creation of a new record, among other things, may require establishing appropriate relationships between the new record and one or more related records. This means providing a cascade create is difficult to achieve for more complex data models. In other words, conventional database programs do not provide a mechanism for creating and populating related records for arbitrary data relationships and/or situations. By way of example, conventional database programs do not provide a "cascade create" option if the non-existing record is related to two or more tables and there is a need to propagate data between a parent, intermediate, and a child table.

Accordingly, improved techniques for providing a "cascade create" mechanism for database programs are needed.

SUMMARY OF THE INVENTION

Broadly speaking, the invention pertains to techniques for entering data in non-existing related records of a database. As will be described below, the techniques support arbitrary data relationships, as well as complex data models, which are not supported by conventional techniques. The techniques can be used to, among other things, support graphical relationship (e.g., a tree), bi-directional relationships, data relationships that span several tables, and multiple predicates (e.g., equality predicates, non-equality predicates). It will also be appreciated that the "cascade create" mechanism frees the users or database programmers from having to write code or provide rules that are specific to a particular data model and/or data relationship.

In accordance with one aspect of the invention, a database program provides a sophisticated "cascade create" mechanism that supports arbitrary data relationships, as well as complex data models which are not supported by conventional techniques. More particularly, the cascade create mechanism allows users to enter data into a related non-existing record (i.e., a record that has not been created in the database, but would be related to one or more records in the database).

In one embodiment, a user can trigger a "cascade create" option by entering data in an empty field which is displayed for the user by the database program. Typically, the empty field is associated with a table in the database. As such, one or more related records may also be displayed for the user by the database program. When the "cascade create" option is triggered, the database program can automatically identify the records that are related to the new record which is requested to be created. In addition, appropriate values can automatically be propagated by the database program between the new record and related records even though the new record is related to one or more intermediate tables between an initial parent table and the child table where the record is requested to be created.

As will be described below, the "cascade create" option can be a recursive method (or function) in accordance with one embodiment of the invention. In addition to managing a relatively simple data model, the same function can also recursively provide the parent record as the next child record for complex data relationships that include one or more intermediate tables (or intermediate parents) table between an initial parent and a child. In addition, when it is appropriate, new intermediate records can be generated by the recursive method. Furthermore, the recursive method can copy "match" values (or values in fields that connect tables in a relationship). As will be appreciated, the recursive function can copy match values (or related fields between tables) from a child table several tables away to a parent table, or vice versa. It should be noted that bi-directional relationships can be supported as the recursive function traverses back and forth between the initial parent table and the initial child table (or target table). It should also be noted that the recursive method can check for multiple predicates, and thus, can support data models with multiple predicates.

The invention can be implemented in numerous ways, including as a method, an apparatus, a computer readable medium, and a database program or system. Several embodiments of the invention are discussed below.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1:
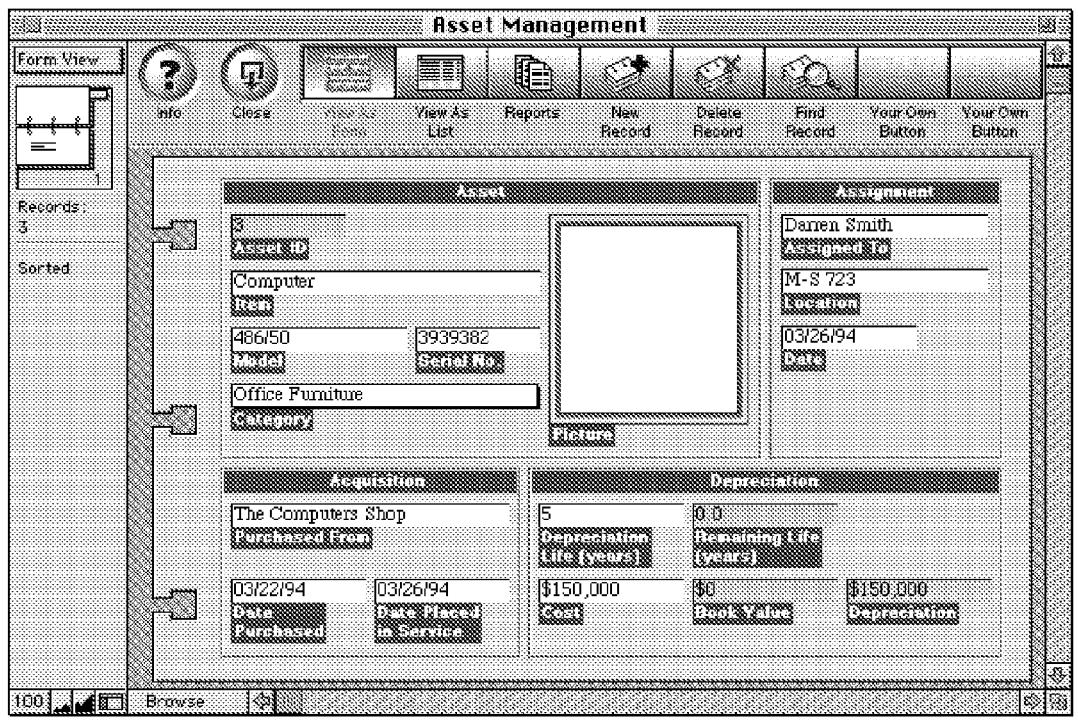
FIG. 1 is a representative screen depiction from a conventional database program. (Prior Art)

As noted in the background section, a "cascade create" mechanism allows data to be entered into a non-existing record in the database. This means that a record can be automatically created and entered for the user by a database program. Moreover, the database program can ensure that the newly created record is properly linked to others related records. The "cascade create" provided by conventional database programs, however, support relatively simple data relationships between a single parent and a single child table. Conventionally, a new record can be created in the child table, and data can be propagated from the child to the parent table. As such, a "cascade create" option that can support more than a simple data relationship between a parent and a child table is desirable. Generally, it is desirable to provide a "cascade create" option that can support arbitrary and more complex data models.

Accordingly, the invention pertains to techniques for entering data in non-existing related records of a database. As will be described below, the techniques support arbitrary data relationships, as well as complex data models, which are not supported by conventional techniques. The techniques can be used to, among other things, support graphical relationship (e.g., a tree), bi-directional relationships, data relationships that span several tables, and multiple predicates (e.g., equality predicates, non-equality predicates). It will also be appreciated that the "cascade create" mechanism frees the users or database programmers from having to write code or provide rules that are specific to a particular data model and/or data relationship.

In accordance with one aspect of the invention, a database program provides a sophisticated "cascade create" mechanism that supports arbitrary data relationships, as well as complex data models which are not supported by conventional techniques. More particularly, the cascade create mechanism allows users to enter data into a related non-existing record (i.e., a record that has not been created in the database, but would be related to one or more records in the database).

In one embodiment, a user can trigger a "cascade create" option by entering data in an empty field which is displayed for the user by the database program. Typically, the empty field is associated with a table in the database. As such, one or more related records may also be displayed for the user by the database program. When the "cascade create" option is triggered, the database program can automatically identify the records that are related to the new record which is requested to be created. In addition, appropriate values can automatically be propagated by the database program between the new record and related records even though the new record is related to one or more intermediate tables between an initial parent table and the child table where the record is requested to be created.

As will be described below, the "cascade create" option can be a recursive method (or function) in accordance with one embodiment of the invention. In addition to managing a relatively simple data model, the same function can also recursively provide the parent record as the next child record for complex data relationships that include one or more intermediate tables (or intermediate parents) table between an initial parent and a child. In addition, when it is appropriate, new intermediate records can be generated by the recursive method. Furthermore, the recursive method can copy "match" values (or values in fields that connect tables in a relationship). As will be appreciated, the recursive function can copy match values (or related fields between tables) from a child table several tables away to a parent table, or vice versa. It should be noted that bi-directional relationships can be supported as the recursive function traverses back and forth between the initial parent table and the initial child table (or target table). It should also be noted that the recursive method can check for multiple predicates, and thus, can support data models with multiple predicates.

Embodiments of these aspects of the invention are discussed below with reference to FIGS. 2-9. However, those skilled in the art will readily appreciate that the detailed description given herein with respect to these figures is for explanatory purposes as the invention extends beyond these limited embodiments.

In accordance with one aspect of the invention, a database program can provide a sophisticated "cascade create" option that supports complex data models. The cascade create option allows users to enter data into a related non-existing record. In one embodiment, a user can trigger the "cascade create option" by entering data in an empty field which is displayed for the user by the database program. Typically, the empty field is associated with a table in the database. As such, one or more related records may also be displayed for the user by the database program. When the "cascade create" option is triggered, the database program can automatically identify the records that are related to the new record which should be created for the user. In addition, appropriate values can automatically be propagated by the database program between the new record and related records even though the new record is related to at least one intermediate table between the parent and the child table.

As will be described below, the "cascade create" option can be a recursive method (or function) in accordance with one embodiment of the invention. In addition to managing relatively simple data model, the same function can also recursively provide the parent record as the next child record for complex data relationships that include at least one intermediate parent (or intermediate) table between an initial parent and a child. In addition, when it is appropriate, new parent records can be generated by the recursive method. Furthermore, the recursive method can copy "match" values (or values in fields that connect tables in a relationship). As will be appreciated, the recursive function can copy match values (or related fields between tables) from a child table several tables away to a parent table, or vice versa. It should be noted that bi-directional relationships can be supported as the recursive function traverses back and forth between the initial parent table and the initial child table (or target table). It should also be noted that the recursive method can check for multiple predicates, and thus, can support data models with multiple predicates.

Figure 2:
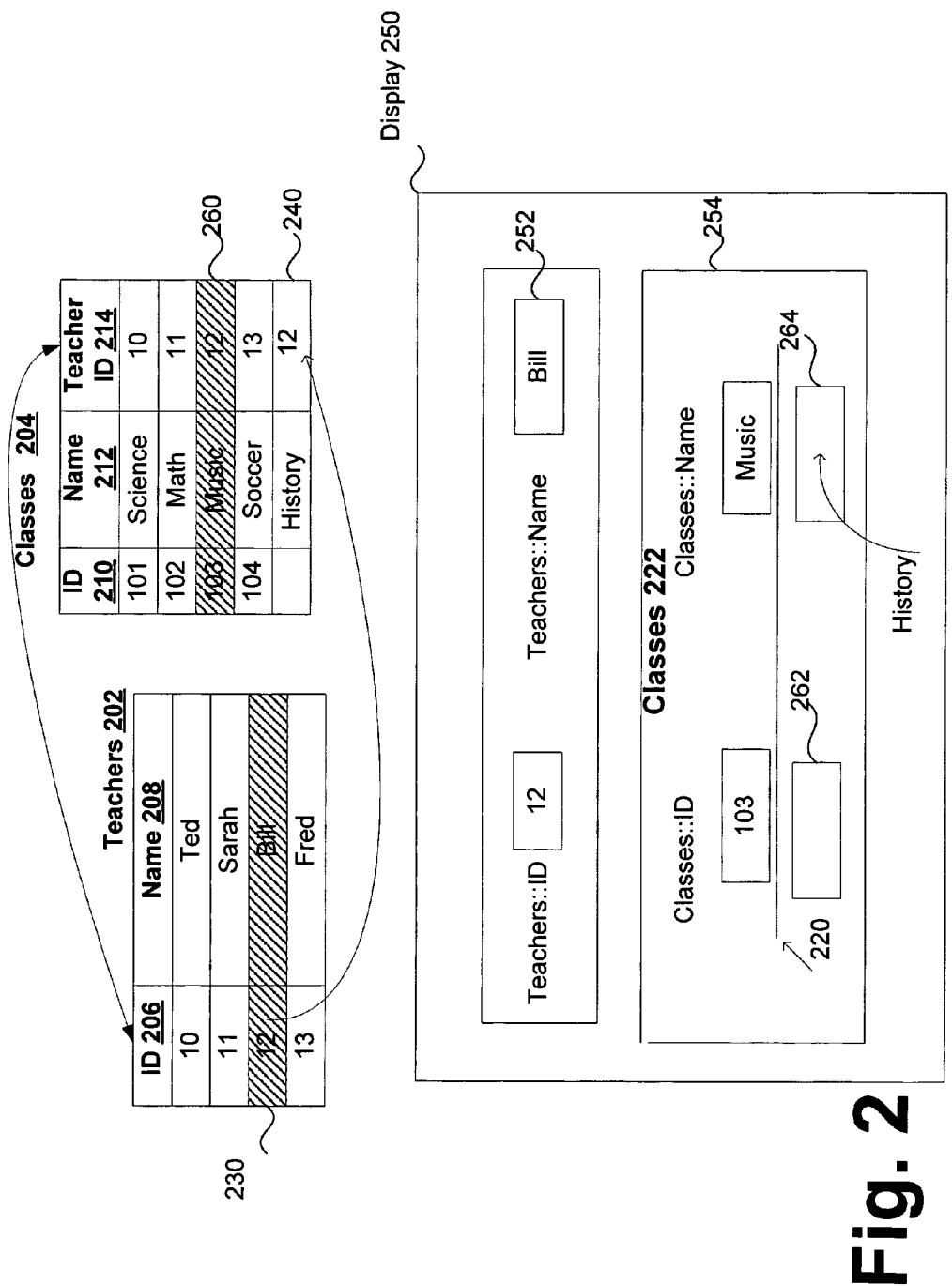
FIG. 2 depicts a "cascade" window in accordance with another embodiment of the invention.

FIG. 2 depicts a "cascade" window display 250 in accordance with one embodiment of the invention. For illustration, FIG. 2 also depicts a very simplified "Teachers" table (or Teachers) 202 and a "Classes" table (or Classes) 204. The "Teachers" table 202 has a "Teacher-ID" field (Teachers::ID) 206 and a Teacher-Name field (Teachers::Name) 208. The "Classes" table 204 has a "Class-ID" field (Classes::ID) 210, a "Class-Name" field (Classes::Name) 212, and a "Classes-Teachers-ID" field (Classes:: teacher-ID) 214. It should be noted that the "Teachers" table 202 and "Classes" table 204 are related by a related field, namely, a Teacher-ID field that appears as "Teachers::ID" 206 in "Teachers" table 202 and as "Classes:: teacher-ID" 214 in the "Classes" table 204. Each one of the "Teachers::ID" 206 and as "Classes:: teacher-ID" 214 may also be referred to as a "match" field.

As shown in FIG. 2, a current record (e.g., record 230) may be displayed in a display 250. This means that each of the fields of the record 230 may be displayed (e.g., "12" and "Bill" for record 230) in a display portion 252. In addition, one or more records that are related to the current record 230 can be displayed in a display portion 254. By way of example, a record 260 in the "Classes" 204 can be displayed in the display portion 254. This indicates that "Bill" teaches a "Music" class with a Class-ID of "103," and so on.

Moreover, one or more empty fields (e.g., 262, 264) representing the fields of the related record may also be displayed. By way of example, when a "cascade create" option from "Teachers" 202 to "Classes" 204 is enabled, an empty "portal" row 220 can be shown. A portal can be refereed to as a user interface object that is capable of showing field data corresponding multiple records to a related table. It should be noted that a portal is capable of showing multiple rows (not shown). If a value (e.g., "History") is entered for the "Classes::Name" 264 in the portal row (entry 264), the "cascade create" can be triggered. The "cascade create" can allow a value (e.g., "History") to be entered even though a record has not been created in the database. In addition, as will be described below the "cascade create" can automatically create a new record and ensure that the relationship between the new records and other related record is properly established.

It should be that the "parent" record for the "cascade create option" is the current record 230 in "Teachers" table 202. In this example, an attempt can be made to create a new record 240 is in the "Classes" 204. Moreover, since the "Teachers" 202 and "Classes" 204 are related to each other based on the "Teachers::ID" 206 and "Classes::Teacher-Id" 214, the "cascade create operation" will automatically attempt to propagate the value of Teachers::Id ("12") form the parent record 230 into the "Classes::Teacher-Id" filed of a newly created record 240 in the "Classes 204." If this attempt to propagate the value of Teachers::ID ("12") is successful, the "cascade create operation" can complete successfully. As a result, a new record 240 can be created, but can remain uncommitted, in the "Classes" 204.

On the other hand, if the propagation attempt fails, an error message can be displayed and the creation of the new class record 240 in the "Classes" 204 is aborted. For example, if an invalid "Teacher::Id" has been entered as the current record, an error message can be displayed to indicate that Teachers:: Id requires a valid value before the related field Classes:: Name can be modified. It should also be noted that a "Class-ID" (Classes::Id) 210 may also be written to the new class-record 240 in the "Classes" 204. This Class Id (Classes::Id) may, for example, be automatically generated or entered by the user.

Figure 3:
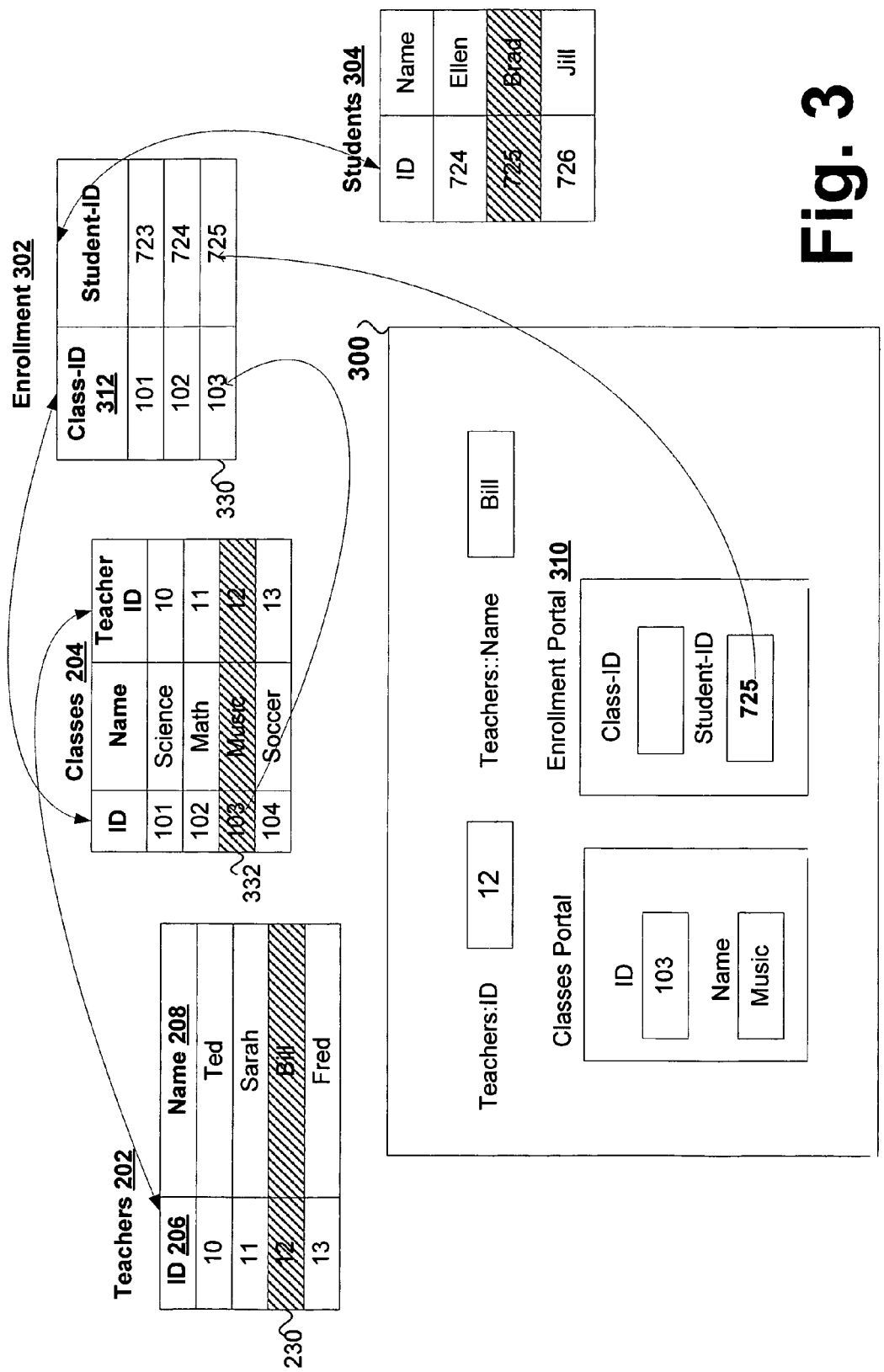
FIG. 3 depicts a "cascade" window in accordance with another embodiment of the invention.

FIG. 3 depicts a "cascade" window 300 in accordance with another embodiment of the invention. FIG. 3 also depicts a relatively more complex data relationship than the relationship depicted in FIG. 2. More particularly, in addition to the "Teachers" table (or Teachers) 202 and "Classes" table (or Classes) 204 (also shown in FIG. 2), the relational database depicted in FIG. 3 also includes an "Enrollment" table (or Enrollment) 302 and a "Student" table (or Student) 304. It should also be noted that in the example depicted in FIG. 3, the "cascade create option" is enabled from "Classes" 204 to "Enrollment" 302 (i.e., cascade operation is enabled from "Teachers" 202 to "Enrollment" 302). As a result, an "Enrollment portal" 310 can be displayed in the "cascade" window 300. Initially, the "Enrollment portal" 310 may be blank. However, if a user enters a value (e.g., 725) in the "Student-ID" field of the Enrollment portal 310, the "cascade create operation" is triggered. Again, it should be noted that the parent record for the "cascade create operation" is the "Teachers" record 230 ("Tecachers::ID"=12 and "Teachers:: Name"=Bill).

When the "cascade create option" is triggered, a new record (e.g., enrollment record 330) in the target table (e.g., "Enrollment" 302) is initially created. In this example, the "Student-ID" field of the new enrollment record 330 will have the given value entered in the enrollment portal 310 (i.e., "725"). Generally, a determination can be made as to whether there is a matching related record in an intermediate table (e.g., Classes 204) that matches the value of one or more fields (e.g., "Class-ID" field 312) in the new record (e.g., "Enrollment" record 330). If it is determined that there is no such matching related record in an intermediate table (e.g., Classes 204), a new record may be created in the intermediate table (e.g., "Classes" 204) in order to link the newly created enrollment record 330. On the other hand, if it is determined that a matching record exists in the intermediate table (e.g., "Classes" 204), then a determination can be made as to whether the existing record in the intermediate table (e.g., "Classes" 204) should be used or a new record should be created for the intermediate table (e.g., "Classes" 204).

In this example, since the newly created Enrollment record 330 does not have a value in the Class-ID field 312—the "matching" field that relates the "Enrollment 302" to "Classes" 204, a new record in "Classes 204" is not created. As a result, the value from a match field of an existing record in the intermediate table (e.g., "Classes" 204) is copied into the newly created target record (e.g., "Enrollment" record 330). In this example, the value ("103") from the ID Field of the matching record 332 in the "Classes" 204 is copied to the Class-ID filed of the new enrollment record 330.

In any case, regardless or whether a new record is created in the intermediate table (e.g., "Classes" 204), the value of the matching field in the intermediate table (e.g., a matching value from "Classes-ID" field of Classes 204") can be automatically propagated to the newly created record in the target table (e.g., Enrollment record 330 in the "Enrollment" 302). In this case, the matching value of "103" ("Teacher-ID"=12) is propagated to the "Class-ID" 312 of the newly created record 330.

It should be noted that if no matching value in the intermediate table is found and there is no value in the target record for the field that relates the intermediate table with the target table, the "cascade create operation" will fail and the newly created records will be aborted. As a result, an error can be generated. However, in this example, when the matching value (e.g., "103") is found and propagated, the cascade create operation will succeed. As a result, the user of the database can see the newly created record. In addition, although not shown in FIG. 3, when a valid existing Student-ID is entered from the "Students" 304, the "Enrollment portal" 300 can display the matching related field, namely the Students:: Name value (e.g., Brad).

Figure 4:
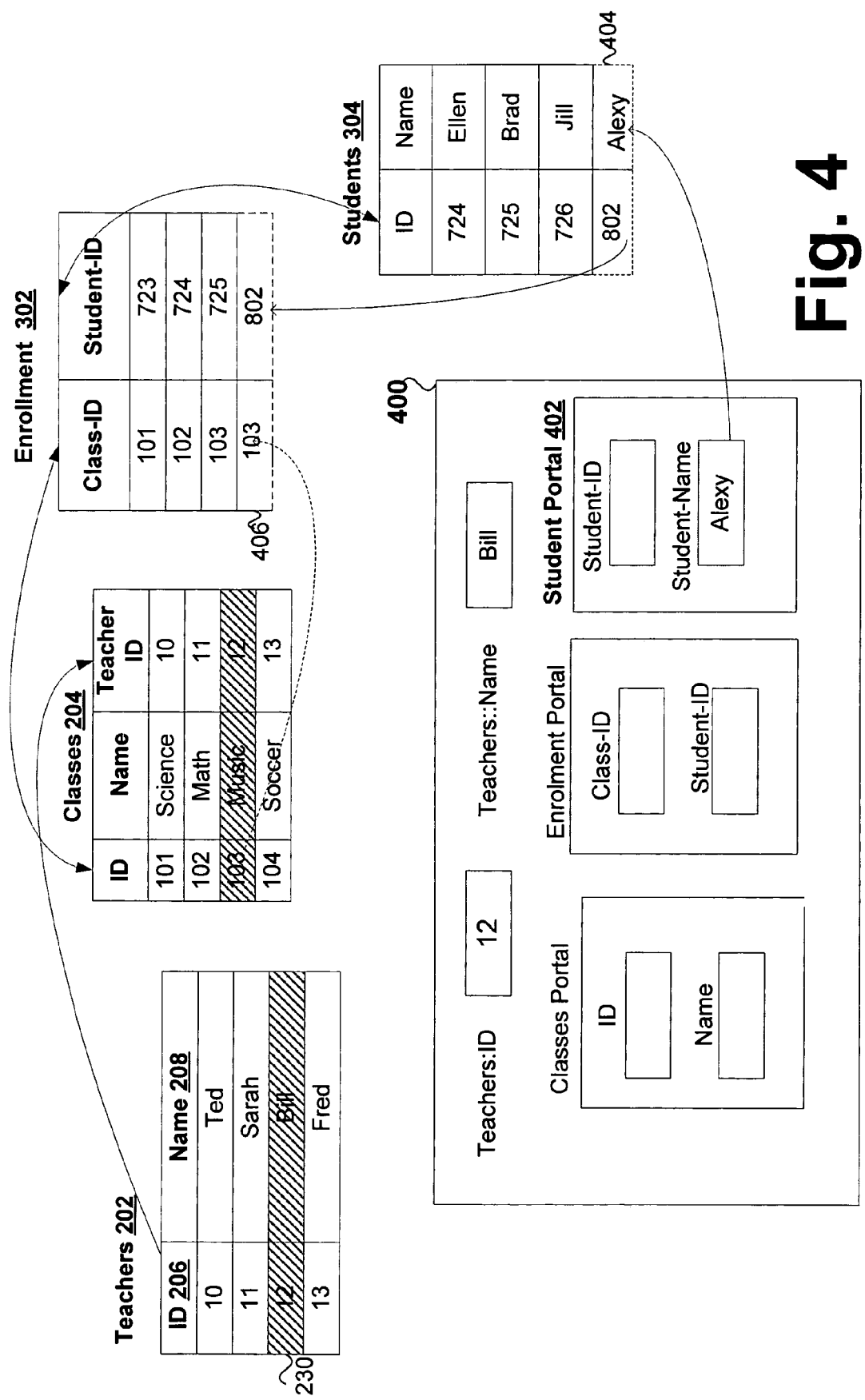
FIG. 4 depicts a "cascade" window in accordance with yet another embodiment of the invention.

FIG. 4 depicts a "cascade" window 400 in accordance with yet another embodiment of the invention. As shown in FIG. 4, the "cascade" window 400 includes a "Students" Portal 402. Although not shown in FIG. 4, it should be noted that in a "layout" form, the "Students" Portal 402 can show all the existing records in the "Students" 304 that relate to the current record in the "Teachers" 202. In other words, the Students Portal 402 can show all the students that enrolled in any class that "Bill" teaches.

Moreover, if the "cascade create option" is enabled from the "Enrollment" 302 to "Students" 304, then one or more empty field entries (e.g., an empty portal row) can be displayed in the "Students" portal 402. When a user attempts to, for example, modify a "Students::Name" field, the cascade create feature can be triggered. Again, the "parent" record in this case is the current record 230 in the "Teachers" table 202.

Initially, a new record 404 in "Students" table 304 in created and the value "Alexy" is entered in the Students::Name field of the new record 304. Next, the immediate parent table of the "Students" table 304 (i.e., "Enrollment" 302) is examined to determine whether there is a record in "Enrollment" table 302 that relates to the current record 230 in the "Teachers" 202. If it is determined that there is no record in "Enrollment" 302 that relates to the current record 230 or if the first record found in "Enrollment" 302 that relates to the current record 230 has a value for "Enrollment::Student-Id", but "Students::ID" also has a value, a new enrollment record will be created in the "Enrollment" table 302. Also, it should be noted that if there is a value in the "Students::ID", it is copied into the corresponding Enrollment::Student-Id.

By way of example, if "Alexy" is entered for the student-name in the student portal 402, "Alexy" is entered in the "Students::Name" field of the new record 404 in "Students 304." In this example, there is no record in "Enrollment" 302 that relates to the current record 230 (i.e., no enrollment record for "Alexy" in a class taught by Bill). In addition, initially, there is no value in the "Students::ID." As such, a new enrollment record 406 is created in the "Enrollment" 302. It should be noted that a "student-ID" (e.g., "802") may, for example, be auto-generated or provided by the user. In any case, the value of "Students::ID" (802) is propagated to the new enrollment record 406. In addition, further operations may be performed to ensure that the tables are all linked. As will be appreciated, a recursive approach can be taken with respect to these operations in accordance with one embodiment of the invention. Some of these operations are discussed below.

In this example, since a new enrollment-record 406 was created, the next immediate parent table ("Classes" 204) can be examined. When a recursive approach is utilized, a recursive function can perform similar operations on the "Classes 204." The recursive function can determine if there is a record in the "Classes" 204 that is related to the current record 230 in the "Teachers" 202. If the recursive function determines that there are no records in the "Classes" 204 which are related to the current record 230 in the "Teachers" 202, a new record in "Classes" 204 will be created. In this example, the "Enrollment::Class-Id" field does not initially have a value. As a result, a new record in the "Classes" 204 is not created. However, it should be noted that the value "103" from "Classes::ID" in the "Classes" 204 is propagated to the "Enrollment::Class-ID" in the Enrollment 302.

It should be noted that if a new record in "Classes" 204 is created, the recursive function can examine the next immediate parent table (i.e., Teachers "202"), and so forth. However, it should also be noted that typically no new record is created in the initial parent table (e.g., "Teachers" 202).

In any case, after moving all the way back to the initial parent table ("Teacher 202"), the recursive function will move forward to determine whether any more values need to be propagated. By way of example, if "Classes::Teacher-Id" in "Classes" 204 does not initially have a value, the value from the "Teachers::ID" in "Teachers" 202 can be copied forward to the appropriate classes record. Similarly, in the next iteration of the recursive function, it is determined that the "Enrollment::Class-Id" in the "Enrollment" 302 doesn't have a value. As a result, the value from Classes::ID in the Classes may be copied to the appropriate record in the "Enrollment" 302. In the next iteration, the recursive function can determine that the matching field, "Students::Id" in Student "304," has already been assigned a value, so no value needs to be propagated.

As will be appreciated, when the recursive function completes, a relational path is established. It should be noted that the relational path that spans all the way between the current record 230 in the "Teachers" 202 and the new enrollment-record 404 in the "Students 304". The recursive function can establish this relationship by checking the intermediate records and propagating value of the matching related fields between several tables when it is appropriate to so do. It should also be noted that in some cases it is possible for the "cascade create option" to fail. By way of example, if no value is provided for the "Students::ID" field either via an auto-enter option or by the user, and no value can be propagated via an intermediate record (i.e., Enrollment record), then the "cascade create option" will fail and the newly created student-record 404 and enrollment-record 406 will be aborted. In some cases, an intermediate records may be created even if "cascade create operation" fails. In this example, if a record was created in the "Classes" 204, but the "cascade create operation" fails due to the absence of, for example, a valid "Students::ID" value, a newly generated record in the "Classes" 204 need not be aborted. However, it should be noted that in most cases it is desirable that a "cascade create option" leave only valid related records.

Figure 5:
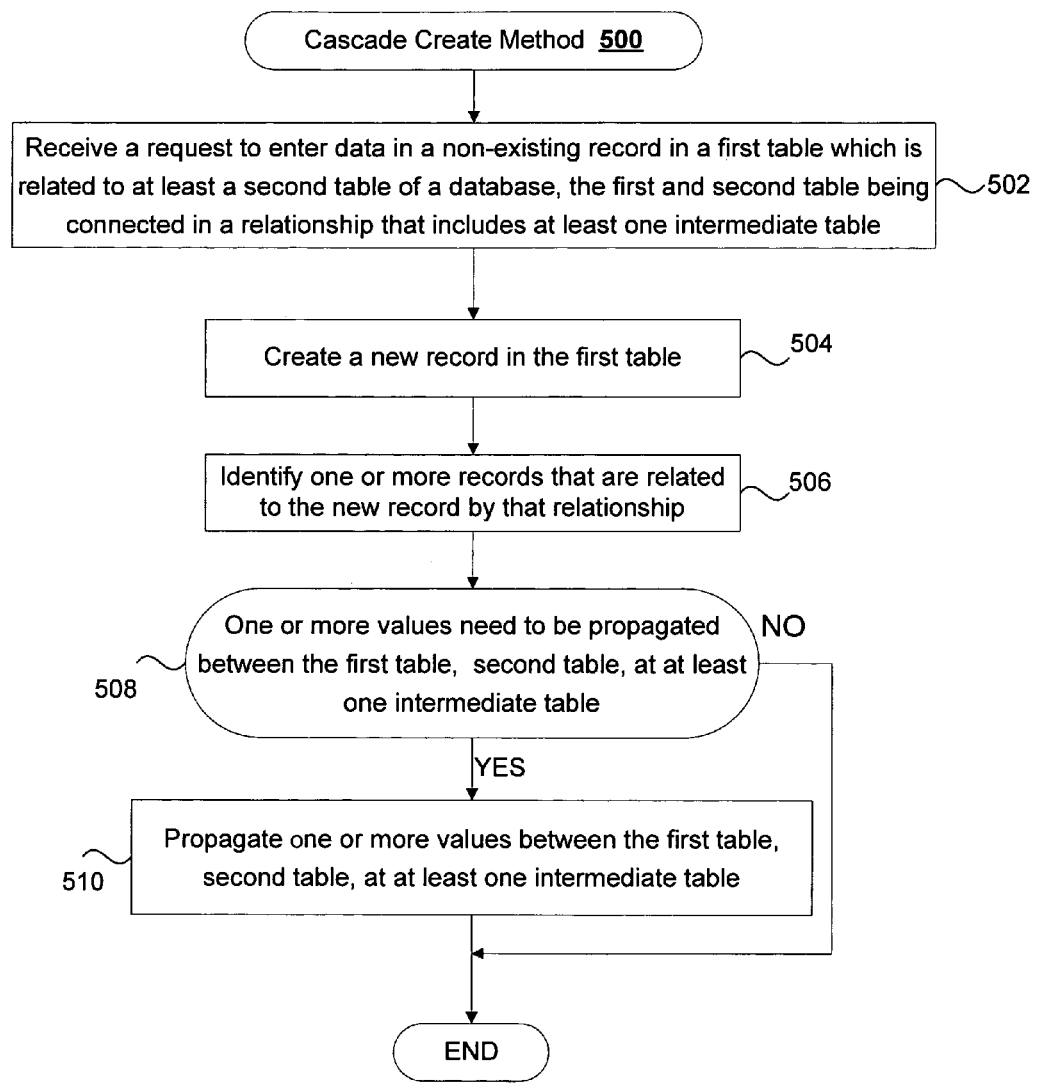
FIG. 5 depicts a cascade create method for allowing data to be entered in a non-existing record of a database in accordance with one embodiment of the invention.

FIG. 5 depicts a cascade create method 500 for allowing data to be entered in a non-existing record of a database in accordance with one embodiment of the invention. Initially, a request to enter data in a non-existing record is received (502). It should be noted that the non-existing record is associated with a first table of a database and typically can be created in a new record in the first table. It should be noted that the first table is related to at least a second table in the database. Typically, the first and second table are related (or connected) in a relationship that includes at least one intermediate table between the first and second tables.

Next, a new record in the first table is created (504). Thereafter, one or more records that are related to the new record are identified (506). It should be noted that the one or more related records are in the second table and/or at least one intermediate table. After the one or more records are identified (506), it is determined (508) whether one or more values need to be propagated between the first table, second table, and at least one intermediate table. If it is determined (508) that one or more values need not to be propagated, the cascade create method 500 ends. However, if it is determined (508) that one or more values need to be propagated, one or more values are propagated (510) between the first table, second table, and at least one intermediate table. The cascade create method 500 ends following operation 510.

Figure 6:
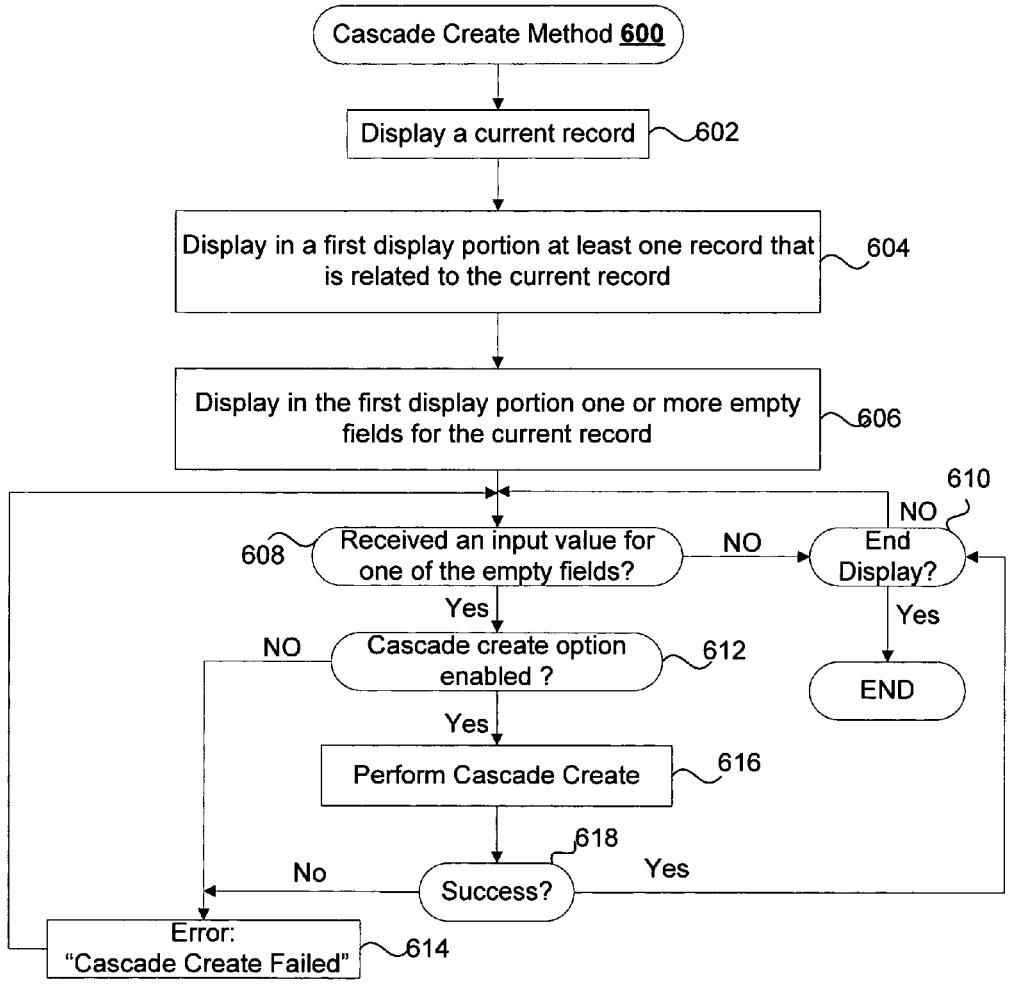
FIG. 6 depicts a cascade create method for allowing data to be entered in a non-existing record of a database in accordance with another embodiment of the invention.

FIG. 6 depicts a cascade create method 600 for allowing data to be entered in a non-existing record of a database in accordance with another embodiment of the invention. Initially, a current record is displayed (602) in a display. Next, at least one record that is related to the current record is displayed (604) in a display portion of the display. It should also be noted that one or more empty fields are also displayed (606) in a first portion of the display. It should also be noted that data may be input in the empty fields.

As such, it is determined (608) whether an input has been received for one of empty fields which have been displayed (606) in the first display portion of the display. If it is determined (608) that an input has not been received, it is determined (610) whether to end the display of the current record. By way of example, display of another record may have been requested. In any case, if it is determined (610) to end the display of the current record, the method cascade create method 600 end. However, if it is determined (610) not to end the display of the current record, it is it is determined (608) whether an input has been received.

If it is determined (608) that an input has been received for one of empty fields which have been displayed (606), it is determined (612) whether cascade create option has been enabled. As will be appreciated, this determination (612) may include determining the extent that cascade creation should be allowed (e.g., how far and between what tables in a related relationship).

In any case, if it is determined (612) that the cascade create option has not been enabled, an error (e.g., "cascade create failed") can be output (614) and it can be determined (608) whether another input value has been received. However, if it is determined (612) that the cascade create option has been enabled, cascade create is performed (616). The cascade create is described below with reference to FIGS. 7-9, but referring back to FIG. 6, after the cascade create is performed (616), it is determined (618) whether it was successful. It is determined (618) that cascade create was not successful, and error can be output (614), and the cascade creation method 600 can proceed in a similar manner as discussed above. However, if it is determined (618) that cascade create was successful, it can be determined (610) whether to end the display.

Figure 7:
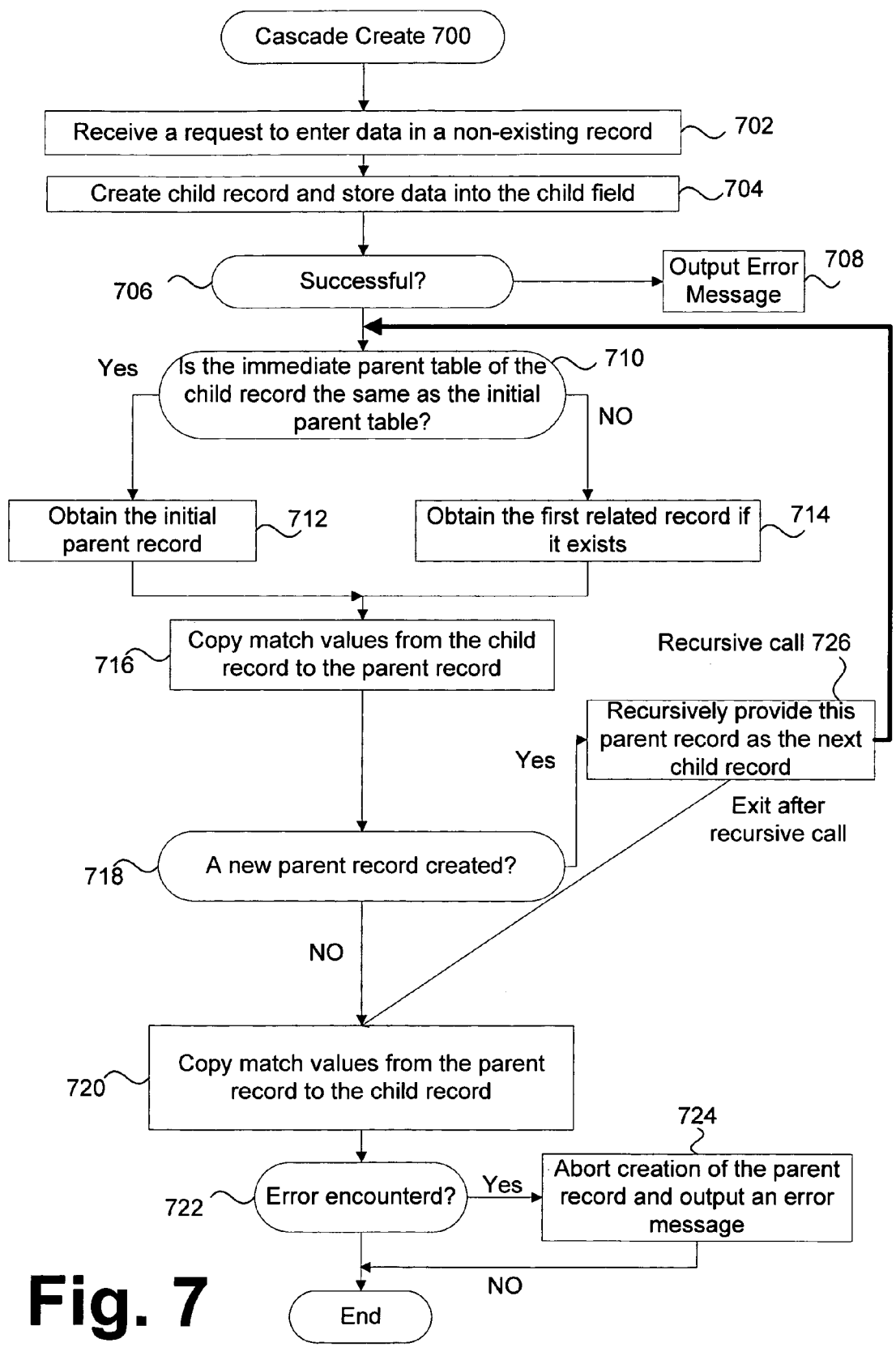
FIG. 7 depicts a cascade create method for allowing data to be entered into a non-existing record of a database in accordance with yet another embodiment of the invention.

FIG. 7 depicts a cascade create method 700 for allowing data to be entered into a non-existing record of a database in accordance with one embodiment of the invention. Initially, a request to enter data in a non-existing record is received (702). Next, a child record is created (704) and data is stored (704) into the appropriate field of the child record. If it is determined (706) that data in the child record was not successfully created or data was not successfully stored, an error message is output (708) and the cascade create method 700 ends. However, if it is determined (706) that data the child record was successfully created and data was successfully stored, it is determined (710) whether the immediate parent table of the newly created child record is the same as the initial parent table (i.e., the very first parent table) that is related to the child record. Again, it should be noted that typically the child record is related to at least one parent record. In addition, one or more related intermediate tables may exist between the initial parent and the child table.

Accordingly, if it is determined (710) that the immediate parent table of the newly created child record is the same as the initial parent table, the initial parent record is obtained (712). However, if it is determined (710) that the immediate parent table of the newly created child record is not the same as the initial parent table, if the first related record exists, it is obtained (714). In any case, match values (i.e., values in the fields that are related) are copied (716) from the child record to the parent record. The copying (716) is further described below with reference to FIG. 8, but it should be noted that it is possible that a record may be created in a parent table as the result of the copying (716). As such, it is determined (718) whether a new parent record has been created as a result of the copying (716). If it is determined (718) that a new record has not been created, the match values are copied (720) from the parent record to the child record. Next, it is determined (722) whether an error has been encountered. If it is determined (722) that an error has been encountered, creation of the parent record(s) is aborted (724) and error message is output (724), and the cascade create method 700 ends. Alternatively, the cascade create method 700 can end immediately following the determination (722), if no error has been encountered.

On the other hand, if it is determined (718) that a new parent record has been created, the parent record is recursively provided (726) as the child record and it is determined (710) whether the immediate parent table of the newly created child record is the same as the initial parent table. Thereafter, the cascade method 700 proceeds in a similar manner as discussed above. It should be noted that when the recursive call (726) exits, the match values are copied (724) from the parent record to the child record.

Figure 8:
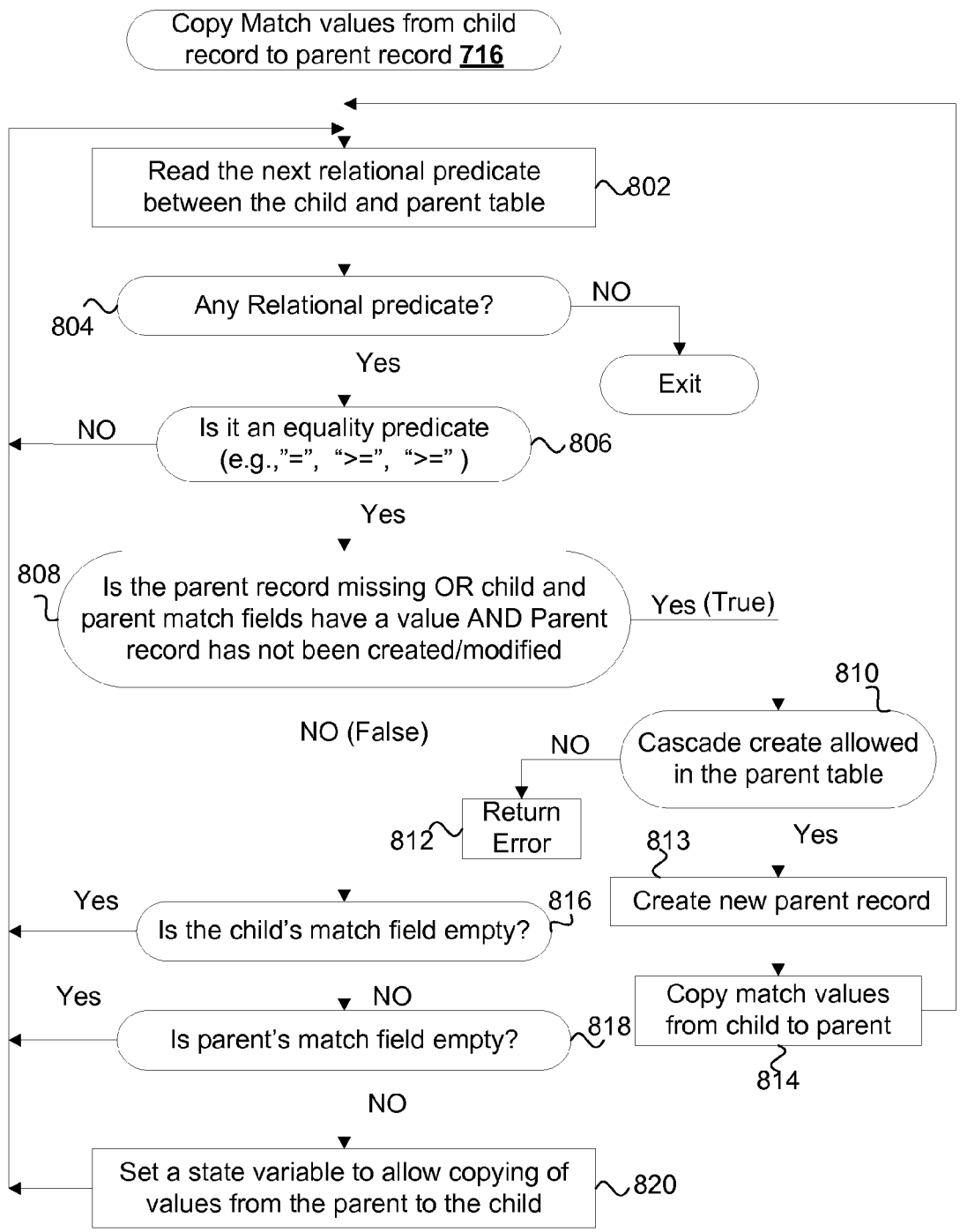
FIG. 8 depicts a child-parent copy method for copying match values from a child record to the parent record in accordance with one embodiment of the invention.

FIG. 8 depicts a child-parent copy method 716 for copying match values from a child record to the parent record in accordance with one embodiment of the invention. The child-parent copy method 716 illustrates in great detail the operations of the copy operation 716 of FIG. 7. Initially, the next relational predicate between the child and parent table is read (802). Next, it is determined (804) whether a relational predicate has been read. If it is determined (804) that no relational predicate was read (802), the child-parent copy method 716 exits. However, if it is determined (804) that a relational predicate has been read (804), it is determined (806) whether the predicate is an equality predicate (e.g., "=", ">=", "<="). If it is determined (806) that the predicate is not an equality predicate, the next relational predicate between the child and parent table is read (802). However, if it is determined (806) that the predicate is an equality predicate, it is determined (808) whether the parent record is missing OR the child and parent match fields has a value AND the record has not been created or modified. If the determination (808) evaluates to true (yes), it is determined (810) whether the cascade create is allowed in the parent table. If it is determined (810) that cascade create is not allowed in the parent table, "error" can be returned (812). However, if it is determined (810) that cascade create is allowed in the parent table, a new parent record is created (813) and the match values are copied (814) from child to parent. Thereafter, the next relational predicate between the child and parent table is read (802) and the child-parent copy match method 716 proceeds in a similar manner as discussed above.

On the other hand, if the determination (808) evaluates to False (No), it is determined (816) whether the child's match field is empty. If it is determined (816) that the child's match field is empty, the next relational predicate between the child and parent table is read (802). However, if it is determined (816) that the child's match field is not empty, it is determined (818) whether the parent's match field is empty. If it is determined (818) that the parent's match field is empty, the next relational predicate between the child and parent table is read (802). However, if it is determined 818 that the parent's match field is not empty, a state variable is set (820) to allow copying of values from the parent to child. Thereafter, the next relational predicate between the child and parent table is read (802) and the child-parent copy method 716 proceeds in the same manner as discussed.

Figure 9:
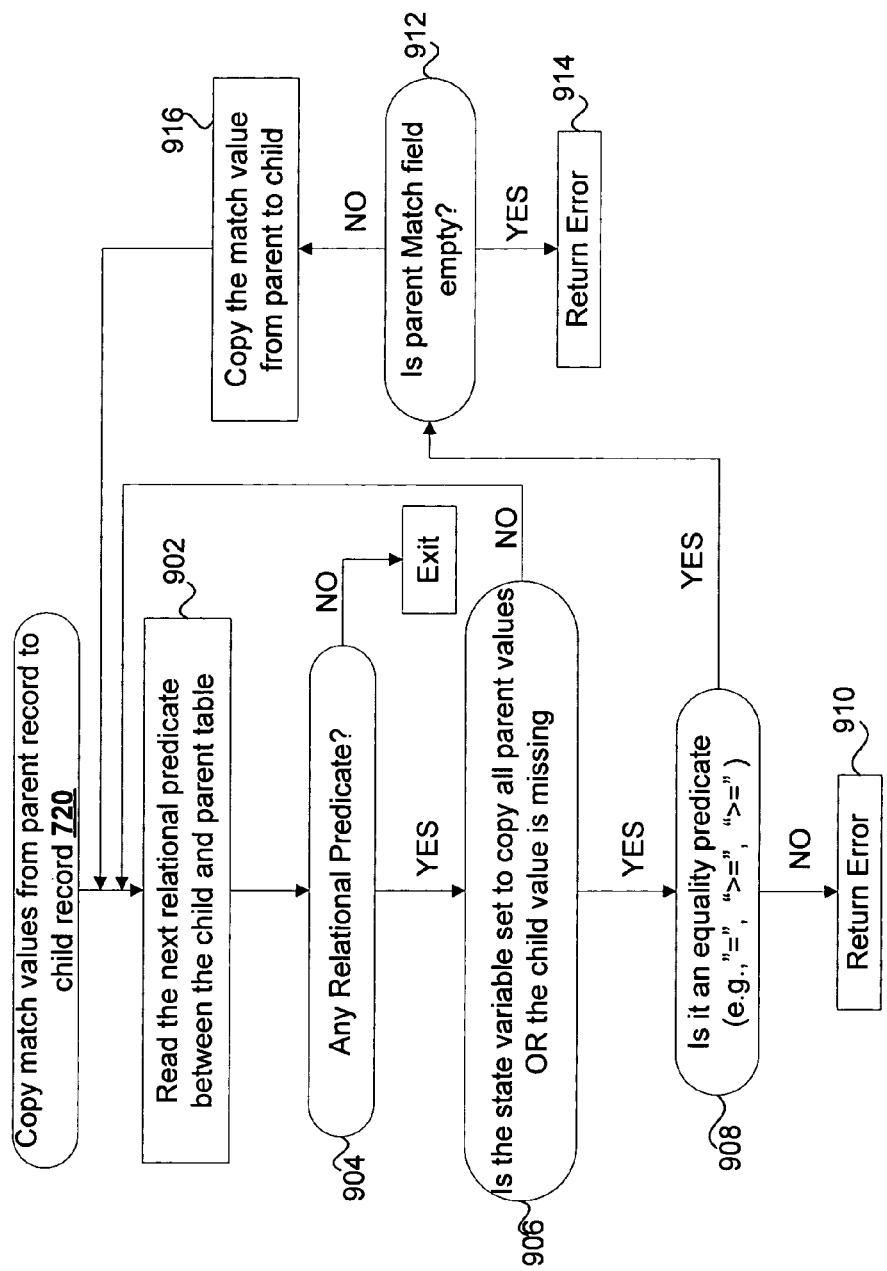
FIG. 9 depicts a parent-child copy method for copying match values from a parent record to a child record in accordance with one embodiment of the invention.

FIG. 9 depicts a parent-child copy method 720 for copying match values from a parent record to a child record in accordance with one embodiment of the invention. The parent-child copy match method 720 illustrates in great detail the copy operation 720 of FIG. 7. Initially, the next relational predicate between the child and parent table is read (902). Next, it is determined (904) whether a relational predicate has been read (902). If it is determined (904) that a relational predicate has not been read (902), the parent-child copy method 720 exits. However, if it is determined (904) that a relational predicate has been read (902), it is determined (906) whether a state variable is set to copy all parent values or the child value is missing. If the determination (906) is evaluated to False (NO), the next relational predicate between the child and parent table is read (902). However, if the determination (906) is evaluated to True (yes), it is determined (908) whether the predicate is an equality predicate. If it is determined (908) that the predicate is an equality predicate, it is determined (912) whether the parent match field is empty. If it is determined (912) that the parent match field is empty, "error" is returned (914). However, it is determined (912) that the parent match field is not empty, the match value is copied (916) from the parent to the child and the next relational predicate between the child and parent table is read (902). Thereafter, the parent-child copy method 720 proceeds in a similar manner as discussed above.

The invention can use a combination of hardware and software components. The software can be embodied as computer readable code on a computer readable medium. The computer readable medium can be any data storage device that can store data which can thereafter be read by a computer system. Examples of computer readable medium include read-only memory, random-access memory, CD-ROMs, magnetic tape, and optical data storage devices. The computer readable media can also be distributed over a network-coupled computer system so that the code is stored and executed in a distributed fashion.

The advantages of the invention are numerous. Different embodiments or implementations may yield one or more of the following advantages. One advantage is that the invention can be implemented to allow the users of database programs to conveniently perform a variety of tasks. Another advantage is that the invention may be added as an additional feature to existing database programs. Yet another advantage is that the invention can support arbitrary and relatively complex data models.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A computer-implemented method of generating new records by a database program that serves as an interface to a database that stores at least a plurality of records in a computer readable medium, said computer-implemented method comprising:

receiving, by said database program, a request to enter data in a non-existing record in said database, wherein said non-existing record has not been created in said database, but is to be created as a first record in a first table which is related in a bidirectional relationship to a second table and at least one intermediate table between said first and second tables in said relationship, wherein said at least one intermediate table has at least one common field in common with each of said first and second tables;

generating, by said database program, said first record in said first table in order to create said non-existing record;

storing, by said database system, said first record in said computer readable medium;

recursively providing a parent record as the next child record in said bidirectional relationship in order to (a) determine whether to propagate one or more values;

copying match values from another parent record of the parent record to the next child record when said determining (a) determines to propagate said one or more values;

copying match values from the next child record of the child record to the other parent record when said determining (a) determines to propagate said one or more values;

entering, by said database program, said data into a field of said first record;

(b) determining, by said database program, whether to propagate one or more values stored in common fields between said first, second, and at least one intermediate table in order to establish said bidirectional relationship for said first record; and automatically propagating, by said database program, at least one of said values stored in said common fields between said first, second, and at least one intermediate table in both directions, thereby automatically creating said bidirectional relationship between said first record and one or more records of said second table and at least one intermediate table.

2. The method as recited in claim 1, wherein said method further comprises determining whether one or more values should be propagated in both directions between said first, second, and at least one intermediate table.

3. The method as recited in claim 2, wherein said one or more values are propagated between said first, second, and at least one intermediate table only if a cascade create option is enabled.

4. The method as recited in claim 1, wherein said method further comprises:

displaying at least one empty field which represents at least one field in a non-existing record;

determining whether a value has been entered in said at least one empty field; and using said value as data to be entered in said first record when said determining determined that said value has been entered in said at least one empty field.

5. The method as recited in claim 1, wherein said copying of match values from said another parent record to said next child record comprises:
obtaining a relational predicate;
determining whether said relational predicate is an equality predicate;
determining whether a state variable is set to copy all parent values; and
determining whether a child value is missing.

6. The method as recited in claim 5, wherein said copying of match values from said another parent record to said next child record further comprises:
determining whether a parent match field that relates said parent record to a child record is empty; and
copying said match value from said parent to said child when said determining determines said parent match field is not empty.

7. The method as recited in claim 1, wherein said copying of match values from said next child record to other parent record comprises:
obtaining a relational predicate; and
determining whether said relational predicate is an equality predicate.

8. The method as recited in claim 7, wherein said copying of match values from said next child record to other parent record comprises one or more of the following:
determining whether a parent record is missing;
determining whether a child and a parent match fields have a value; and
determining whether a parent record has not been created or modified.

9. The method as recited in claim 1, wherein said copying of match values from said next child record to other parent record comprises:
determining whether match fields for a parent and a child are both empty; and
setting a state variable when said determining determines that said match fields for said parent and said child are both not empty, wherein said state variable indicates that values should be copied from said parent to said child.

10. The method as recited in claim 1, wherein said method further comprises:
determining whether a record should be created in at least one intermediate table; and
creating a record in at least one intermediate table when said determining determines that the record should be created in the at least one intermediate table.

11. The method as recited in claim 1, wherein said relationship is an arbitrary relationship, and said first record is created without specific user-code that provides rules that are specific to a particular data model or data relationship.

12. A computer system for accessing a database, wherein said computer system includes at least one processor which is configured for:
receiving a request to enter data in a non-existing record in said database, wherein said non-existing record has not been created in said database, but is to be said relationship, wherein said at least one intermediate table has at least one common field in common with each of said first and second tables;
generating said first record in said first table in order to create said non-existing record;
recursively providing a parent record as the next child record in said bidirectional relationship in order to (a) determine whether to propagate one or more values;
copying match values from another parent record of the parent record to the next child record when said determining (a) determines to propagate said one or more values;
copying match values from the next child record of the child record to the other parent record when said determining (a) determines to propagate said one or more values;
entering said data into a field of said first record;
(b) determining whether to propagate one or more values stored in common fields between said first, second, and at least one intermediate table in order to establish said bidirectional relationship for said first record; and
automatically propagating at least one of said values stored in said common fields between said first, second, and at least one intermediate table in both directions, thereby automatically creating said bidirectional relationship between said first record and one or more records of said second table and at least one intermediate table.

13. The computer system as recited in claim 12, wherein said one or more values are propagated between said first, second, and at least one intermediate table only if a cascade create option is enabled.

14. The computer system as recited in claim 12, wherein said computer system is further configured for:
displaying at least one empty field which represents at least one field in a non-existing record;
determining whether a value has been entered in said at least one empty field;
and
using said value as data to be entered in said first record when said determining determined that said value has been entered in said at least one empty field.

15. The computer system as recited in claim 12, wherein said copying of match values from said another parent record to said next child record comprises:
obtaining a relational predicate;
determining whether said relational predicate is an equality predicate;
determining whether a state variable is set to copy all parent values; and
determining whether a child value is missing.

16. The computer system as recited in claim 12, wherein said copying of match values from said next child record to other parent record comprises one or more of the following:
determining whether a parent record is missing;
determining whether a child and a parent match fields have a value; and
determining whether a parent record has not been created or modified.

17. A computer readable medium including at least computer program code for generating new records in a database that stores at least a plurality of records, said computer readable medium comprising:
computer program code for receiving a request to enter data in a non-existing record in said database, wherein said non-existing record has not been created in said database, but is to be created as a first record in a first table which is related in a bidirectional relationship to a second table and at least one intermediate table between said first and second tables in said relationship, wherein said at least one intermediate table has at least one common field in common with each of said first and second tables;
computer program code for generating said first record in said first table in order to create said non-existing record;

computer program code for recursively providing a parent record as the next child record in said bidirectional relationship in order to (a) determine whether to propagate one or more values;

computer program code for copying match values from another parent record of the parent record to the next child record when said determining (a) determines to propagate said one or more values;

computer program code for copying match values from the next child record of the child record to the other parent record when said determining (a) determines to propagate said one or more values;

computer program code for entering said data into a field of said first record;

computer program code (b) determining whether to propagate one or more values stored in common fields between said first, second, and at least one intermediate table in order to establish said bidirectional relationship for said first record; and computer program code automatically propagating by at least one of said values stored in said common fields between said first, second, and at least one intermediate table in both directions, thereby automatically creating said bidirectional relationship between said first record and one or more records of said second table and at least one intermediate table.

18. The computer readable medium as recited in claim 17, wherein said computer readable medium further comprises:

computer program code for displaying at least one empty field which represents at least one field in a non-existing record;

computer program code for determining whether a value has been entered in said at least one empty field; and computer program code for using said value as data to be entered in said first record when said determining determined that said value has been entered in said at least one empty field.

19. The computer readable medium as recited in claim 17, wherein said one or more values are propagated between said first, second, and at least one intermediate table only if a cascade create option is enabled.

20. The computer readable medium as recited in claim 17, wherein said copying of match values from said another parent record to said next child record comprises:

obtaining a relational predicate;

determining whether said relational predicate is an equality predicate;

determining whether a state variable is set to copy all parent values; and determining whether a child value is missing.

21. The computer readable medium as recited in claim 17, wherein said copying of match values from said another parent record to said next child record further comprises:

determining whether a parent match field that relates said parent record to a child record is empty; and copying said match value from said parent to said child when said determining determines said parent match field is not empty.

22. The computer readable medium as recited in claim 17, wherein said copying of match values from said next child record to other parent record comprises:

obtaining a relational predicate; and determining whether said relational predicate is an equality predicate.

23. The computer readable medium as recited in claim 17, wherein said copying of match values from said next child record to other parent record comprises one or more of the following:

determining whether a parent record is missing;

determining whether a child and a parent match fields have a value; and determining whether a parent record has not been created or modified.

24. The computer readable medium as recited in claim 17, wherein said copying of match values from said next child record to other parent record comprises:

determining whether match fields for a parent and a child are both empty; and setting a state variable when said determining determines that said match fields for said parent and said child are both not empty, wherein said state variable indicates that values should be copied from said parent to said child.

* * * * *